United States Patent
Asgar-Deen et al.

(10) Patent No.: US 7,552,358 B1
(45) Date of Patent: Jun. 23, 2009

(54) EFFICIENT BACKUP AND RESTORE USING METADATA MAPPING

(75) Inventors: Terrence Asgar-Deen, San Luis Obispo, CA (US); Anthony T. Orling, San Luis Obispo, CA (US); Mark J. Nicolini, Orlando, FL (US); Steven R. DeVos, Kirkland, WA (US)

(73) Assignee: Symantec Operating Corporation, Mountain View, CA (US)

( * ) Notice: Subject to any disclaimer, the term of this patent is extended or adjusted under 35 U.S.C. 154(b) by 541 days.

(21) Appl. No.: 11/182,992

(22) Filed: Jul. 15, 2005

Related U.S. Application Data

(60) Provisional application No. 60/674,224, filed on Apr. 22, 2005.

(51) Int. Cl.
*G06F 11/00* (2006.01)
(52) U.S. Cl. .................... 714/6; 714/15; 714/20
(58) Field of Classification Search ............. 714/6, 714/15, 20; 711/161, 162; 707/202, 204
See application file for complete search history.

(56) References Cited

U.S. PATENT DOCUMENTS

| | | | | |
|---|---|---|---|---|
| 5,276,860 | A * | 1/1994 | Fortier et al. ................. | 714/6 |
| 6,442,706 | B1 * | 8/2002 | Wahl et al. ................... | 714/6 |
| 6,694,447 | B1 * | 2/2004 | Leach et al. .................. | 714/6 |
| 6,950,871 | B1 * | 9/2005 | Honma et al. ............... | 709/226 |
| 6,981,177 | B2 * | 12/2005 | Beattie ...................... | 714/20 |
| 7,047,379 | B2 * | 5/2006 | Boyd et al. ................. | 711/162 |
| 7,082,506 | B2 * | 7/2006 | Nakano et al. ............. | 711/162 |
| 7,162,599 | B2 * | 1/2007 | Berkowitz et al. .......... | 711/162 |
| 7,243,256 | B2 * | 7/2007 | Kaiya et al. .................. | 714/2 |
| 2004/0153719 | A1 * | 8/2004 | Achiwa et al. ............... | 714/5 |
| 2004/0167942 | A1 * | 8/2004 | Oshinsky et al. ........... | 707/204 |
| 2004/0260899 | A1 * | 12/2004 | Kern et al. ................... | 711/162 |
| 2005/0038968 | A1 * | 2/2005 | Iwamura et al. ............. | 711/162 |
| 2005/0081091 | A1 * | 4/2005 | Bartfai et al. ................ | 714/6 |
| 2005/0193179 | A1 * | 9/2005 | Cochran et al. ............. | 711/162 |
| 2006/0101213 | A1 * | 5/2006 | Morita ........................ | 711/162 |
| 2006/0242370 | A1 * | 10/2006 | Suzuki et al. ............... | 711/162 |

OTHER PUBLICATIONS

"IPStor® Continuous Data Replication"; FalconStor Software, 2005.
"Data Domain™ Replicator; Reducing the Cost of Online Data Replication for Disaster Recovery and Remote Backup"; Data Domain; Sep. 2004.

* cited by examiner

*Primary Examiner*—Joshua A Lohn
(74) *Attorney, Agent, or Firm*—Meyertons Hood Kivlin Kowert & Goetzel, P.C.; B. Noël Kivlin

(57) ABSTRACT

A method for efficient backup and restore using metadata mapping comprises maintaining a first backup aggregation associated with a primary data object of a primary host at a secondary host, wherein the first backup aggregation includes a first backup version of the primary data object stored within a secondary data object at the secondary host. The method further comprises generating a second backup aggregation, wherein the second backup aggregation includes a second backup version of the primary data object and a backup metadata object corresponding to the secondary data object. The backup metadata object includes a pointer to the second backup version. The method may further comprise restoring the secondary data object, wherein said restoring comprises using the pointer to access the second backup version of the primary data object to restore at least a portion of the secondary data object.

31 Claims, 7 Drawing Sheets

EFFICIENT BACKUP AND RESTORE USING METADATA MAPPING

This application claims the benefit of U.S. provisional patent application Ser. No. 60/674,224, entitled "Advanced Techniques For Data Protection And Restoration", filed Apr. 22, 2005.

BACKGROUND OF THE INVENTION

1. Field of the Invention

This invention relates to computer systems and, more particularly, to data backup and restoration within computer systems.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Any one of a variety of factors, such as system crashes, hardware storage device failures, software defects, or user errors (e.g., an inadvertent deletion of a file) may potentially lead to data corruption or to a loss of critical data in such environments. In order to recover from such failures, various kinds of backup techniques may be employed. Traditionally, for example, backup images of critical data may have been created periodically (e.g., once a day) and stored on tape devices. However, a single backup version of production data may not be sufficient to meet the availability requirements of modern mission-critical applications. For example, for disaster recovery, it may be advisable to back up the data of a production application at a remote site, but in order to be able to quickly restore the data in the event of a system crash or other error unrelated to a large-scale disaster, it may be advisable to store a backup version near the production system. As a consequence, in some storage environments, multiple stages of backup devices or hosts may be employed. A first backup version of a collection of production files may be maintained at a file system at a secondary host, for example, and additional backup versions may be created periodically at tertiary hosts from the secondary host file system. The use of multiple stages may also help to reduce the impact of backup operations on production application performance. In some environments, multiple layers of additional backup versions may be generated for additional enhancements to availability: for example, production data may be copied from a production host or server to a first layer backup host, from the first layer to a second layer, from the second layer to a third layer, and so on. Hosts or servers at several of the layers may also be susceptible to similar kinds of errors or faults as the production hosts, and hence may also need some level of backup support for their own data, as well as for the backup versions of production hosts' data.

Traditionally, the ability to initiate restore operations has often been restricted to backup administrators or other backup experts, and end users have usually not been allowed to restore data objects. However, requiring administrators to support restore operations needed as a result of common errors (such as inadvertent deletions of user files) may lead to unnecessary delays and reduced productivity. Techniques that allow end users to perform restore operations as needed (e.g., on objects to which the end users have access permissions, such as a file owned by an end user and inadvertently overwritten by the end user), without requiring the end users to understand the details of backup layers or to know where backup versions are physically stored, may thus help reduce administrative costs and improve overall organizational efficiency.

Traditional backup techniques may also result in data duplication in some cases. For example, in some environments, snapshot facilities (e.g., provided by an operating system) may be used to create point-in-time images of data that is to be backed up at one or more layers of a backup hierarchy. For each snapshot of a collection of data, some traditional snapshot techniques may store a "path" for the original or source version of the data, and may be capable of restoring the data of the snapshot to the path associated with the snapshot. Thus, for example, if the data of two production directories A and B were backed up at a secondary host directory C, and a snapshot of C (with an associated path to C) were created at a tertiary host using such a snapshot technique, the typical way to restore A from the snapshot would be to first restore C to the secondary host, and then copy A from the secondary host to the primary host. If a direct restoration from the tertiary host to the production system were desired, additional snapshots associated with the paths to A and B would be needed. Creating such additional snapshots may, however, result in duplication of data, because the contents of A and B would also be stored within the snapshot of C. The cost of duplicating data in this manner may quickly become unsustainable, especially in environments where hundreds of images may at least partly duplicate data stored in other images. If, on the other hand, only snapshots of A and B were stored on the tertiary host in the example describe above in an effort to minimize storage used for the snapshots, and no snapshot of C were stored, the ability to restore C (which may also have contained data other than the copies of A and B) from the tertiary host may be lost.

SUMMARY

Various embodiments of methods and systems for efficient backup and restore using metadata mapping are disclosed. According to one embodiment, a method comprises maintaining a first backup aggregation associated with a primary data object of a primary host at a secondary host. The first backup aggregation (e.g., a replica of a collection of primary data objects such as files) may include a first backup version of the primary data object, and may be stored within a secondary data object (e.g., a directory or file) at the secondary host. The method may include generating a second backup aggregation, e.g., from the first backup aggregation, where the second backup aggregation includes a second backup version of the primary data object (such as an image generated using a snapshot technique) and a backup metadata object corresponding to the secondary data object. The backup metadata object may include a pointer to the second backup version of the primary data object, and may also include other information such as application-specific data restoration rules in some embodiments.

When the secondary data object is to be restored from the second backup aggregation, the method may further include using the pointer to access the second backup version of the primary data object to restore at least a portion of the secondary data object. By using metadata pointers instead of backing up the entire contents of the secondary data object within its own backup version, data duplication within the second backup aggregation may be avoided, while still supporting the ability to independently restore either the secondary data object or the primary data object. The second backup aggregation may be stored at a tertiary host, and the method may further include directly restoring the primary data object from the second backup version at the tertiary host to a primary restoration target. Restoration of either the primary data object or the secondary data object may be initiated, for example, automatically upon a detection of a failure, or in response to a user request or an administrator request.

According to one embodiment, the method may include restoring the primary data object to a primary restoration target after determining whether the restoration is to be performed directly or using a multi-stage restoration process. A multi-stage restoration process may be used, for example, in order to reduce the impact of the restoration on applications at the primary host, e.g., by postponing the restoration to the primary restoration target until the workload level at the primary host falls below a specified threshold. If the restoration is to be performed in a multi-stage process, the method may include first restoring the primary data object from the second backup version to a secondary restoration target, and then restoring the primary data object from the secondary restoration target to the primary restoration target. If the restoration is performed directly from the second backup version to the primary restoration target, the method may include synchronizing the first backup aggregation with the primary restoration target after the direct restoration is completed. The determination as to whether a multi-stage restoration process is to be employed may be made, for example, in response to user input (e.g., if a user specifies that multi-stage replication is to be used in a replication request), or automatically by a backup manager that may be configured to monitor the workload level at the primary restoration target and initiate multi-stage replication if the workload level is above a specified threshold.

Figure 1:
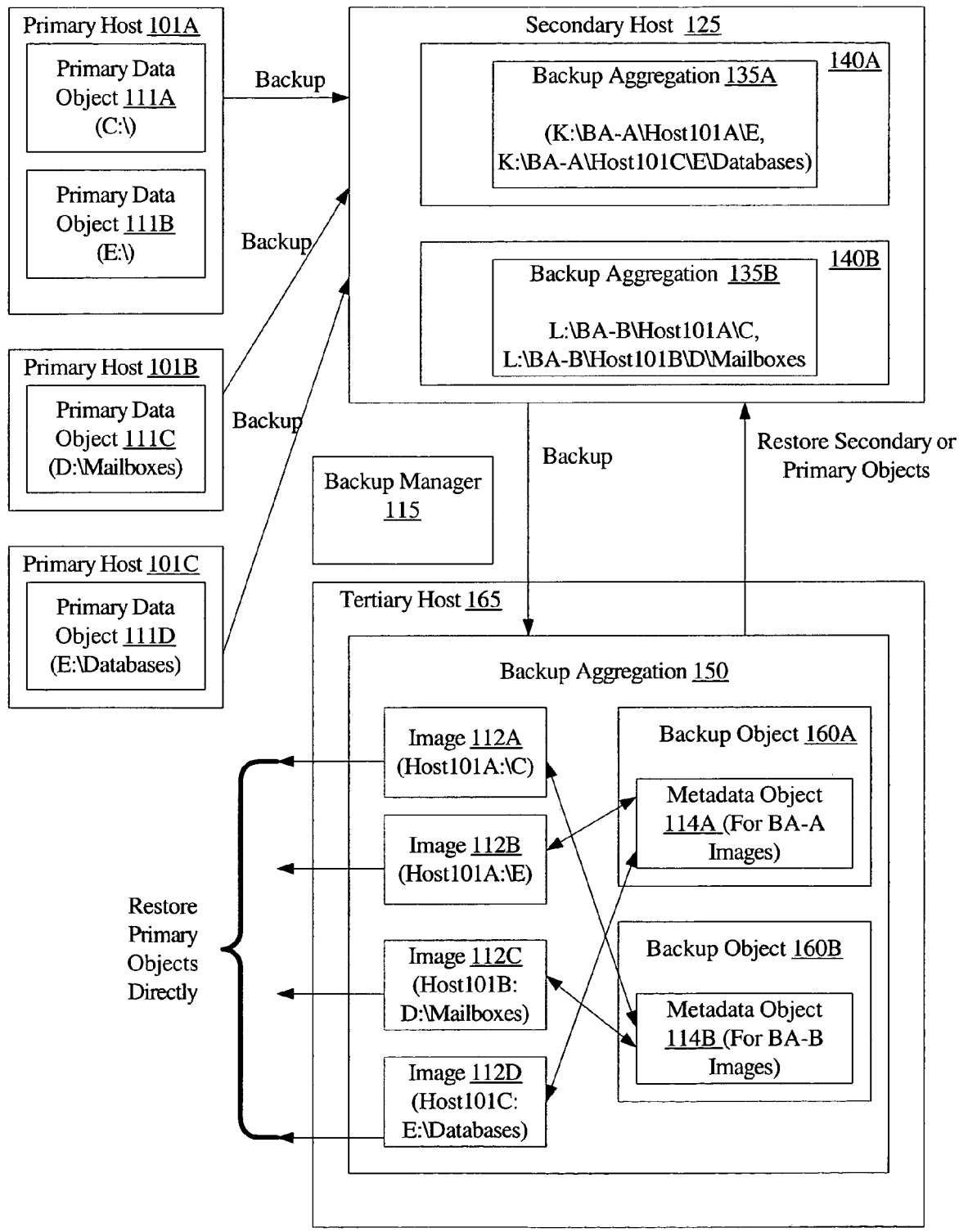
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a backup manager 115, a plurality of primary hosts 101 (e.g., primary hosts 101A, 101B, and 101C), a secondary host 125, and a tertiary host 165. As described below in further detail, various components of backup manager may be executed at primary hosts 101, secondary host 125, tertiary host 165, and/or at other hosts in different embodiments. Each primary host 101 may be configured to execute a set of one or more applications whose data objects may be backed up (e.g., using replication, snapshot generation, or any other desired backup technique or using a combination of backup techniques) by backup manager 115. For example, primary host 101A may include primary data objects 111A and 111B for a file server application, primary host 101B may include primary data object 111C for an electronic mail server application, and primary host 101C may include primary data object 111D for a database management application. The term "data object", as used herein, may refer to any collection of one or more data items for which backup and restore functionality may be desired, such as one or more file systems, directories (which may also be termed "folders"), files, logical volumes, database entities such as tablespaces, tables or indexes, etc. In the embodiment depicted in FIG. 1, for example, primary data object 111A includes the contents of drive or directory "C:\" at primary host 110A, primary data object 111B includes the contents of drive "E:\" on primary host 101A, primary data object 111C includes the contents of directory "D:\Mailboxes" at primary host 101B, and primary data object 111D includes contents of directory "E:\Databases" at primary host 101C. Primary hosts 101 may be linked to secondary host 125 using a first network (not shown in FIG. 1), and secondary host 125 may be linked to tertiary host 165 using a second network (also not shown). The performance capabilities of the two networks may differ in some embodiments, e.g., the links between primary hosts 101 and secondary host 125 may be faster and/or provide greater throughput than links between secondary host 125 and tertiary host 165. In other embodiments, primary, secondary and tertiary hosts may all be linked by a single network or by different networks having equivalent performance capabilities.

Backup manager 115 may be configured to maintain one or more backup aggregations at secondary host 125, such as backup aggregations 135B and 135A, where each backup aggregation is associated with a set of primary data objects 111. The phrase "backup aggregation", as used herein, refers to a collection of backup versions of a set of data objects and configuration information for the backup versions. A backup aggregation associated with one or more data objects may be generated and/or maintained using any of a variety of backup techniques in different embodiments, such as various types of replication (e.g., synchronous or asynchronous replication), snapshot or frozen image creation techniques, etc., and may be used to restore any of the one or more data objects, e.g., in the event of data corruption, inadvertent deletion of data, storage device failure, etc. In FIG. 1, backup aggregation 135A may be stored within secondary data object 140A (e.g., directory "K:\" at secondary host 125), and backup aggregation 135B may be stored within secondary data object 140B (e.g., directory "L:\" at secondary host 125). Backup aggregation 135A may include backup versions of primary data objects 111A and 111C, e.g., at "K:\BA-A\Host101A\E" and "K:\BA-A\Host101C\E\Databases" respectively. Backup aggregation 135B may include backup versions of primary data objects 111B and 111D, e.g., at "L:\BA-B\Host101A\C" and "L:\BA-B\Host101B\D\Mailboxes" respectively.

In addition to the backup aggregations 135 maintained at secondary host 125, backup manager 115 may also be configured to generate one or more backup aggregates 150 at a tertiary server 165. The backup aggregates 150 may, for example, be snapshots of secondary host data taken according to a snapshot schedule, e.g., once every hour. Backup aggregate 150 may be associated with a set of primary data objects 111 as well as with a set of secondary data objects 140, that is, it may be possible to restore either primary data objects or secondary data objects directly from backup aggregation 150. In the embodiment depicted in FIG. 1, for example, backup aggregate 150 includes four backup images 112A-112D of primary data objects 111A-111D respectively, and backup objects 160A and 160B corresponding to secondary data objects 140A and 140B respectively. Backup images 112 and/or backup objects 160 may each be physically stored as a single "binary large object" or "blob" in some implementations. The inclusion of images corresponding to primary data objects 111 within backup aggregation 150 may allow direct restoration of the primary data, objects from the tertiary server 165, as indicated by the four arrows emerging to the left from the images 112A-112D. Direct restoration of primary data objects may be a particularly useful feature in environments where end users are given restore capabilities. During backup from primary hosts 101 to secondary host 125 and then again from secondary host 125 to tertiary host 165, for example, data from a particular primary data object such as a file system may be distributed across a number of secondary and tertiary objects in various ways, and/or combined with data corresponding to other primary objects within the same secondary or tertiary data object, depending on the specific backup algorithms used. Since end users (unlike administrators or backup experts) may not be aware of the mappings between primary and secondary data objects or between secondary data objects and objects at tertiary hosts 165, and may not even be aware of the two-level backup architecture shown in FIG. 1, creating backup images 112 that correspond to primary data objects known to and understood by the end users may help to simplify the end users' restore-related tasks. In addition, by generating images from the secondary host 125 rather than from the primary hosts 101 themselves, backup manager 115 may help to reduce the impact of image generation on production applications running at primary hosts 101.

Backup manager 115 may also be configured to provide support for restoration of secondary data objects 140 using backup objects 160A and 160D. As shown in FIG. 1, secondary data object 140A includes backup aggregation 135A, and images 112B and 112D may represent point-in-time copies of the contents of backup aggregation 135A. Backup object 160A, corresponding to secondary data object 140A, includes metadata object 114A with pointers to the images 112B and 112D. Similarly, backup object 160B includes metadata object 114B with pointers to images 112A and 112C, representing point-in-time copies of the contents of backup aggregation 135B. The pointers may be implemented using a variety of specific techniques in different implementations. For example, the pointers may include the names or unique identifiers for images 112, and/or may provide mappings between the physical location of the images (e.g., starting offset and length in bytes) within one or more storage devices such as physical or logical volumes, disks or tapes, and the corresponding physical locations within the secondary data objects 140. In addition to the pointers, in some embodiments the metadata objects 114 may also include other information, such as rules that govern how specific types of data objects should be restored, timestamps, statistics such as the time taken to create the backup object 160, etc. For example, in one embodiment where an image 112 includes a blob representing a collection of electronic mail mailboxes, the rules included in the metadata object 114 may indicate how a specific user's mail messages (or an individual mail message) may be extracted from the blob. Thus, metadata objects 114 may provide a mechanism for application-specific restoration rules to be specified, allowing backup manager 115 to tailor restoration operations specifically for different applications and different image granularities (e.g., in some embodiments, the rules may differ depending on how the backup versions in backup aggregates 135 are bundled into images 112).

In restoring a secondary data object 140A, backup manager 115 may be configured to use the pointers in the metadata 114A to access the contents of images 112B and 112D, and restore at least a portion of the secondary data object 140A from those images. Backup manager 115 may be configured to initiate the restoration based on a variety of factors in different embodiments, such as in response to a detection of a failure condition, in response to user-generated requests, etc. Similarly, to restore secondary data object 140B, backup manager may be configured to use pointers in metadata 114B to access and copy contents of images 112A and 112C. In embodiments where information other than pointers, such as application-specific restoration rules, is included in the metadata objects, such additional information may also be used during the restoration. By using metadata pointers to existing images 112 of primary data objects during restoration of the secondary data objects that included backup versions of those primary data objects, it may be possible to avoid creating full images of the secondary data objects themselves, which would have resulted in duplication of data. By avoiding data duplication, substantial cost savings may be achieved, especially in environments where large numbers of images are being generated and stored, without sacrificing the ability to selectively restore either secondary data objects, primary data objects, or both secondary and primary data objects.

Primary data objects 111, secondary data objects 140, as well as tertiary data objects where backup aggregates 150 are stored, may each be stored on any desired type of physical storage, such as direct-attached disks, disk arrays etc., or network attached storage, storage are network (SAN) devices, etc. It is noted that in some embodiments, a secondary data object 140 may also include additional data other than a backup aggregation 135; in such embodiments, the backup object 160 corresponding to the secondary data object may also include a copy of the additional data. For example, in one such embodiment, secondary host 125 may be a multi-purpose server running its own set of applications, and some of the data of these applications may be stored within a secondary data object 140 together with a backup aggregation 135. If a secondary object 140 includes only a backup aggregation 135, and all the contents of the backup aggregation are represented in corresponding images 112, metadata objects 114 may be sufficient to restore the secondary data object in some implementations (i.e., copies of additional data may not be included within backup objects 160). In some embodiments, one or more secondary storage objects 140 may not include any backup versions of primary data objects 111, and a copy of the contents of such a secondary storage object 140 may be included within backup aggregation 150 without a corresponding metadata object 114. It is also noted that in some embodiments, objects may be restored to restoration targets (i.e., logical or physical storage locations at which the restored data is to be stored) other than the original locations of the objects. E.g., it may be possible to restore a file that was originally stored at a directory location "C:\abc\def\gh.txt" at a given host to a different directory location "D:\temp\gh.txt" and/or at a different host. While backup images (i.e., point-in-time copies) 112 of primary data objects 111 are shown in backup aggregation 150 in the embodiment of FIG. 1, in other embodiments, backup techniques other than image generation, such as synchronous or asynchronous replication, may be used to generate backup versions corresponding to primary data objects at tertiary host 165. Multiple layers of backups may be used in some embodiments, as described below in further detail in conjunction with the description of FIG. 4.

In the embodiment depicted in FIG. 1, restoration of primary data objects 111 may in general be performed using either backup aggregations 135 at the secondary host 125, or backup aggregation 150 at the tertiary host 165. In one embodiment, as described below in further detail, replication (e.g., synchronous or asynchronous replication) of primary may be used to maintain backup aggregations 135, while backup aggregation 150 may represent a point-in-time copy or snapshot of primary and secondary data objects. In such an embodiment, backup aggregations 135 may be updated in place shortly after changes occur at the corresponding primary data objects 111, while new backup aggregations 150 may be generated from the secondary host 125 at a desired frequency, such as once every hour. In such an embodiment, if a version of a primary data object 111 as of a specified point in time (e.g., as of 10 AM on Jun. 1, 2005) is desired, and the replicated version of the primary data object within a backup aggregation 135 already represents a point in time after the desired restoration point (e.g., changes that occurred after 10 AM on Jun. 1, 2005 have already been replicated at secondary host 125), a backup aggregation 150 corresponding to the specified point in time may have to be used for the restoration. In this example, if an image 112 of the primary data object 111 as of the desired restoration point exists, contents of that image 112 may be used to directly restore the primary data object from the tertiary host 165. Since a direct restoration from the tertiary host 165 to a primary host 101 may result in one or more backup aggregations 135 becoming out of synchronization with respect to the restored primary data object 111, in some embodiments, the backup aggregations 135 may be synchronized with the restored version of the primary data object.

In some embodiments, in restoring a primary data object 111 from tertiary host 165 to a particular restoration target, backup manager 115 may be configured to make a determination whether the primary data object is to restored in a multi-stage restoration process (i.e., whether the contents of the primary data object are to be copied first to an intermediate location and then from the intermediate location to the restoration target). The determination may be made based on various factors, for example, based on user input (e.g., if a user explicitly requests multi-stage restoration and/or identifies the intermediate location), based on a time of day (e.g., direct restorations to production hosts may not be allowed during peak usage hours), or based on a restoration staging policy in use at the backup manager. For example, in one embodiment, where the primary data object directory "E:\" of primary host 101A is to be restored from an image 112B at tertiary host 165, the restoration policy may require that the restoration to host 101A should only be performed when the workload level at host 101A is below a designated threshold level, so that production application transactions in progress that are using other primary data objects at host 101A are not affected by the restoration. The workload level threshold may be defined in terms of any combination of a variety of workload metrics in various embodiments, such as processor utilization levels, disk queue sizes, network utilization levels, etc. In such an embodiment, if host 101A's measured workload level is higher than the threshold, and especially if restoration directly from the tertiary host 165 to the primary host 101A is over a slow network and/or requires more processing than restoration from secondary host 125, backup manager 125 may be configured to make the determination that a multi-stage restoration process should be used. The contents of the image 112B may first be restored to a secondary restoration target, such as a temporary or staging directory at secondary host 125, and then from the secondary restoration target to the designated primary restoration target. If backup manager 115 makes a determination that multi-stage restoration is not required, a direct restoration of the primary data object 111 may be performed from the image 112 at the tertiary host 165. In some embodiments, as described above, a synchronization of one or more backup aggregations 135 at the secondary host 125 with the primary restoration target may be required after the direct restoration. In addition, in some embodiments, a snapshot corresponding to the restored primary data object may be generated from the backup aggregation 135 after it has been synchronized.

Figure 2A:
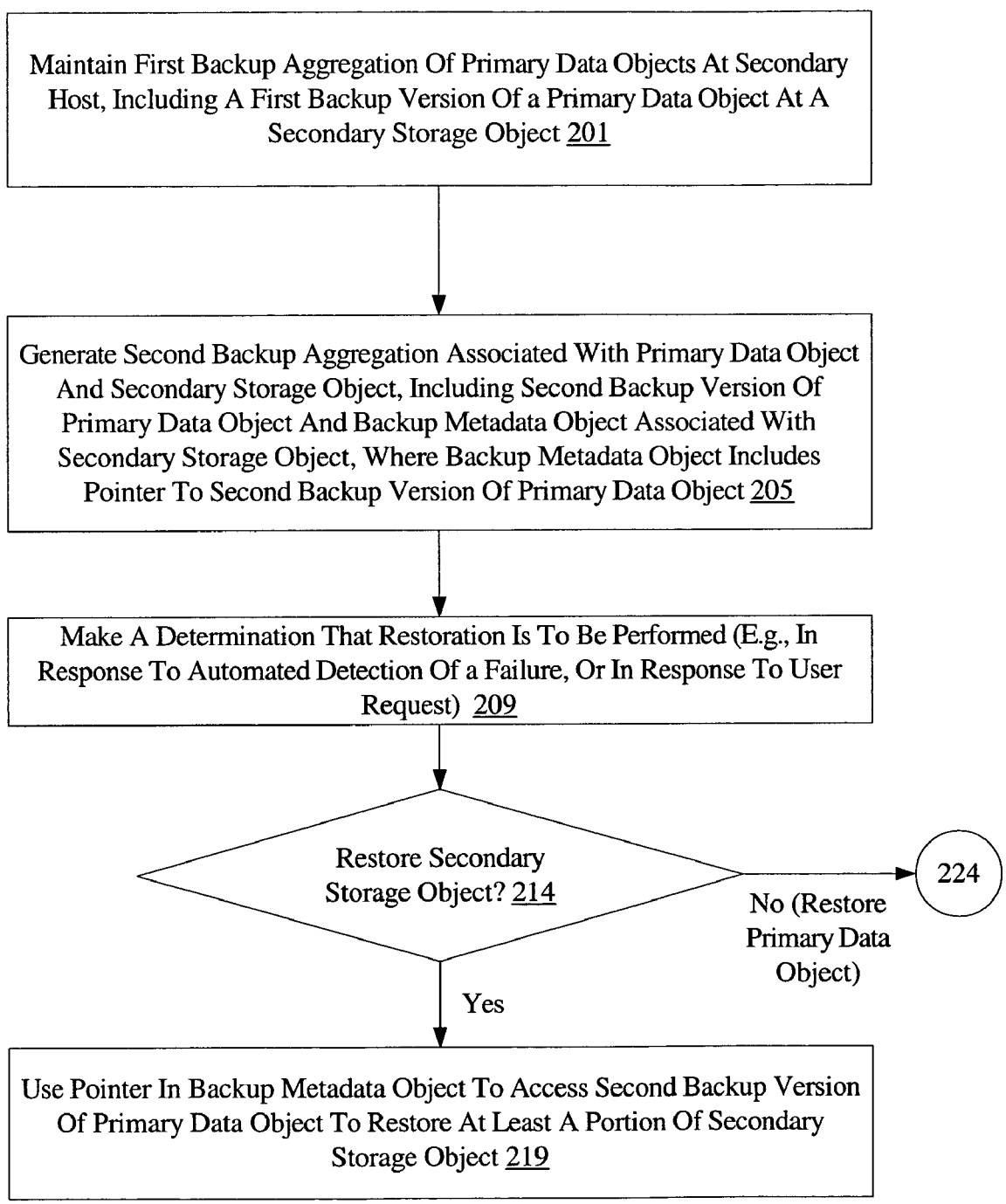
FIG. 2*a* and FIG. 2*b* are flow diagrams illustrating aspects of the operation of a backup manager, according to one embodiment.
Figure 2B:
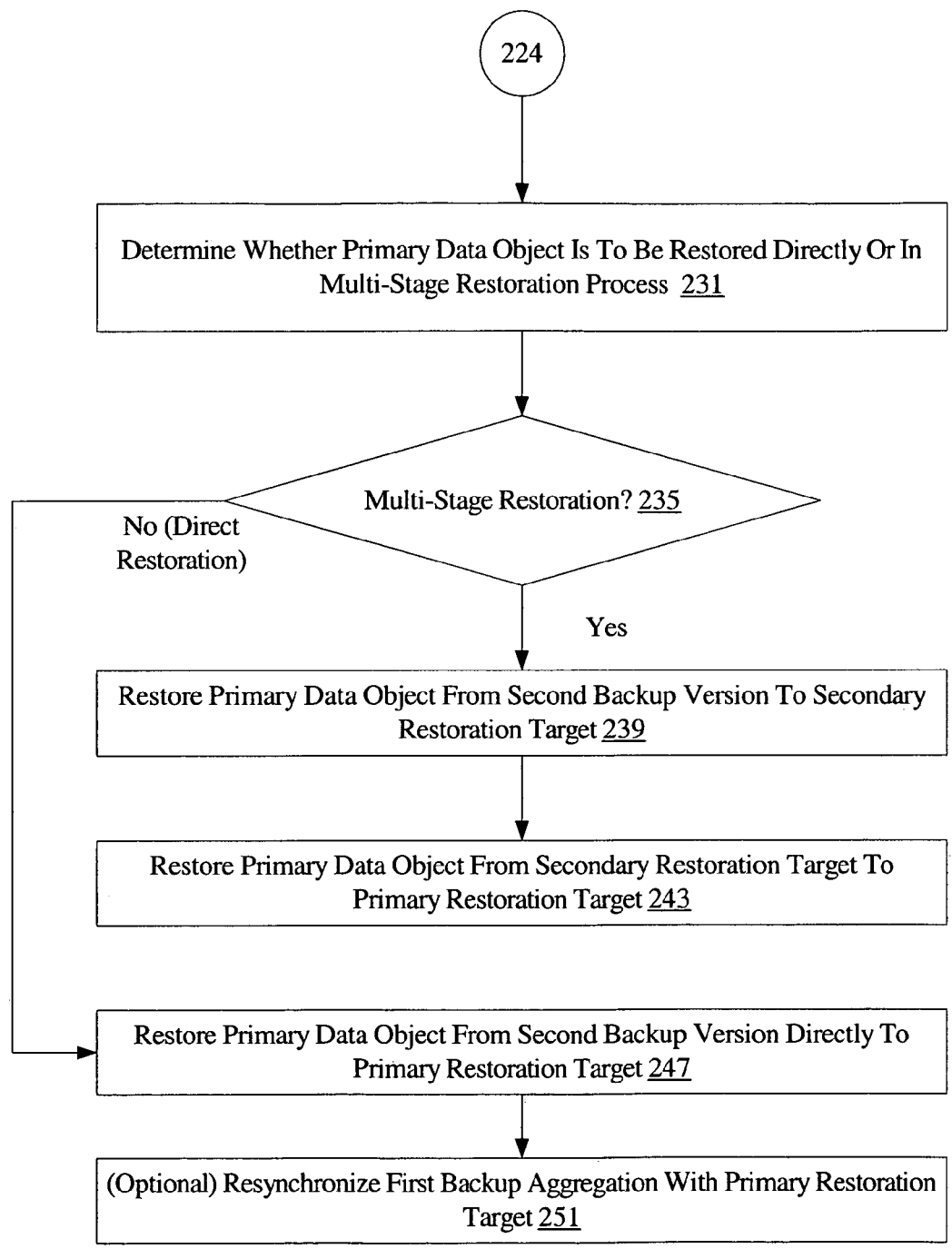

FIG. 2a and FIG. 2b are flow diagrams illustrating aspects of the operation of backup manager 115, according to one embodiment. As shown in block 201 of FIG. 2a, backup manager 115 may be configured to maintain a first backup aggregation 135 associated with one or more primary data objects 111 at a secondary host 125. A first backup version of a primary data object 111 may be maintained within a secondary storage object 140 (e.g., a replica of primary data object "E:\" of host 101A may be maintained within a backup aggregation at secondary storage object "K:\BA-A" at secondary host 125). Backup manager 115 may be configured to generate a second backup aggregation 150 associated with one or more primary data objects 111 and with one or more secondary data objects 140, e.g., at tertiary host 165 (block 205 of FIG. 2a). The second backup aggregation 150 may include second backup versions of primary data objects 111, as well as backup metadata objects 114 corresponding to secondary data objects 140. The backup metadata object for a particular secondary data object 140 may include pointers to second backup versions of primary objects. For example, if a particular secondary data object 140A includes a backup version of a given primary data object 111B, and if a second backup version 112B of the given primary data object 111B is included in the second backup aggregate, a backup metadata object 114A for the particular secondary data object 140A may include pointers to the second backup version 112B. As noted above, the pointers may include the names or unique identifiers for images 112, and/or may provide mappings between the physical location of the images (e.g., starting offset and length in bytes) within one or more storage devices such as physical or logical volumes, disks or tapes and the corresponding physical locations within the secondary data objects 140. In some embodiments multiple backup aggregations 150 may be generated in sequence, e.g., by generating snapshots and metadata objects from the first backup aggregation or aggregations 135 after specified time intervals.

As a result of any of a variety of factors, e.g., due to inadvertent deletion of data, storage device failure, data corruption caused by intruders, etc., a restoration of a primary or secondary data object may be required. In some embodiments, the backup manager 115 may be configured to automatically detect the need for a restoration operation (e.g., the backup manager may be notified when a file system becomes unavailable), while in other embodiments, restoration requests may be initiated by users. In some embodiments, backup manager 115 may also be configured to participate in migrating backup versions of data objects from one storage device to another, e.g., from disk-based storage to tape-based storage, and the migration operations may be implemented as restoration operations to a targeted storage device. In such an embodiment, restoration may be performed according to a specified schedule, e.g., a migration schedule may indicate that a data object such as a snapshot of a volume is to be migrated to a tape device after 30 days of storage on disk. On making a determination that restoration is required (block 209 of FIG. 2a), if a secondary storage object 140 is to be restored (as determined in decision block 214 of FIG. 2a), backup manager 115 may be configured to use pointers included within the backup metadata object 114 corresponding to the secondary storage object to access contents of second backup versions 112 of primary data objects to restore at least a portion of the secondary storage object (block 219 of FIG. 2a). If a primary data object is to be restored (as also determined in decision block 214), operations corresponding to blocks 231 onwards of FIG. 2b may be performed (following a path through node 224 of FIG. 2a). As described above, in some embodiments backup manager 115 may be configured to make a determination whether a multi-stage restoration is to be performed, or direct restoration is to be performed (block 231 of FIG. 2b). The determination may be made based on a variety of different factors in different embodiments, e.g., based on user-supplied directives, time-of-day considerations, and/or in accordance with a restoration staging policy in use at the backup manager. If multi-stage restoration is to be used (as detected in decision block 235), the backup manager 115 may be configured to first restore the primary data object from a second backup version 112 within second backup aggregation 150 to a secondary restoration target (e.g., at secondary server 125) (block 239), and then restore the primary data object from the secondary restoration target to the primary restoration target (block 243). The secondary restoration target may be explicitly specified by a user in some implementations—e.g., a particular directory or file system at secondary host 125 may be specified as the location where restored versions of data objects are to be stored. In implementations where a request for restoration indicates that multi-stage restoration is to be performed, the request may include a specification of the secondary restoration target. In some embodiments, the restoration to the secondary restoration target may be performed as a background process to minimize the impact of the restoration on the secondary host 125. In other embodiments, the restoration process may include more than two stages.

If direct restoration is to be used (as also determined in decision block 235 of FIG. 2b), the primary data object 111 may be restored directly from the second backup version at tertiary host 125 to the primary restoration target (block 247). In embodiments where such a direct restoration may result in the first backup version becoming unsynchronized with respect to the restored version of the primary data object, the first backup aggregation may be resynchronized with the primary restoration target (block 251).

Figure 3:
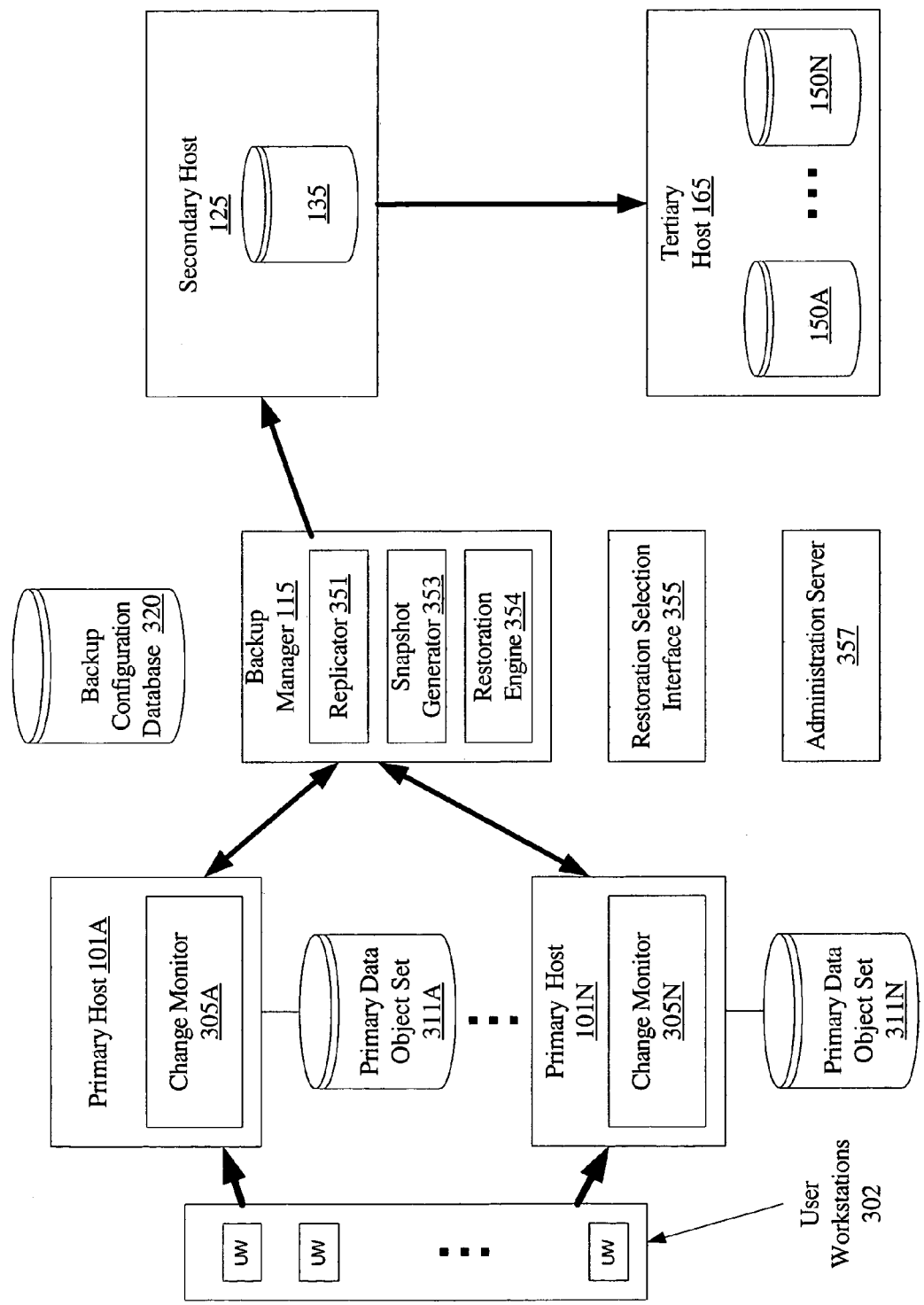
FIG. 3 is a block diagram illustrating an embodiment where updates to primary data objects may be detected as they occur, and where the detected updates may be replicated to a backup aggregation.

FIG. 3 is a block diagram illustrating an embodiment where updates to primary data objects may be detected as they occur, and where the detected updates may be replicated to a backup aggregation 135. As shown, primary hosts 101A-101N may each include a respective set of primary data objects 311—e.g., primary host 101A may include primary data object set 311A, primary host 101N may include primary data object set 311N, etc. The primary data object sets 311 may represent data of various applications being executed, for example, on behalf of a plurality of users at user workstations (UW) 302. In one embodiment, for example, one of the applications being supported by one or more primary hosts 101 may be an on-line banking service, or an Internet auction service. As input from the user workstations is received, corresponding data transactions may be initiated, which may result in updates to primary data objects within object sets 311.

In one embodiment, one or more of the primary hosts 101 may include respective change monitors 305, such as change monitor 305A at primary host 101A, that may be configured to monitor a specified set of data objects of a corresponding primary data object set 311 for changes. When changes such as object creations, deletions or modifications are detected, the change monitor 305 may be configured to inform the backup manager 115 (e.g., via a journaling mechanism), and a replicator 351 within the backup manager may be configured to replicate the changes at the secondary host 125. In some implementations, replicator 351 may be configurable to perform replication operations in either direction, as desired—e.g., from primary hosts to secondary hosts, or from secondary hosts to primary hosts. In one specific embodiment, change monitor 305 may be configured to detect a variety of I/O operations (e.g., operations to read, write, or modify attributes such as security or ownership attributes of files) performed on the set of primary data objects, and to notify the backup manager 115 of the I/O operation detected. Replicator 351 may be configured to then replicate the I/O operation at one or more backup aggregations 135 at the secondary host 125. In this way, changes being made at primary hosts 101 may be very quickly reflected at the secondary host 125—e.g., the state of the backed up versions of primary data objects at secondary host 125 may track the state of the primary object data sets 311 to within a few milliseconds in some implementations. Such a replication process, in which changes being made to the primary data objects are detected and replicated in real time may be termed "continuous replication" or "real-time replication", and the backup manager 115 may be termed a "continuous protection server" in embodiments supporting continuous replication. It is noted that in some embodiments, periodic replication rather than continuous replication may be employed; for example, changes made to primary data objects may be accumulated and replicated in batches. e.g., once every five minutes. Change monitors 305 may be implemented via file system filter drivers in some embodiments, which may be configured to intercept I/O operations as they are executed at the primary hosts 101. In one embodiment, change monitors 305 may be configured to periodically check for changes to data objects, instead of continuously monitoring for changes. In another embodiment, the replication process may include a synchronization of a primary data object set 311 (e.g., a file system) with a replica at secondary host 125, with the additional capability of monitoring and replicating changes that occur at the source data set after the synchronization begins—that is, both synchronization and continuous replication may be performed by backup manager 115. In some embodiments, backup and restoration operations may be managed in transactional units called jobs.

In addition to supporting continuous and/or periodic replication as described above, in some embodiments backup manager 115 may also include a snapshot generator 353, configured to create snapshots or point-in-time versions of desired subsets of the replicated data. For example, in one embodiment, snapshot generator 353 may be configured to create new images 112 of specified sets of primary data objects from the backup aggregations 135 once every hour (or at any specified frequency), and to store the images within backup aggregations 150 at tertiary host 165. As described above, backup objects for secondary objects 140, including metadata objects 114 with pointers to images 112, may also be stored within backup aggregations 150. Thus, secondary host 125 may serve as a staging area for backed up data between the primary hosts 101 and tertiary hosts 165. In some embodiments, tape devices or optical storage devices such as various types of jukeboxes may be used for tertiary storage, while in other embodiments, the tertiary storage devices may include disks, disk arrays and the like. Snapshot functionality provided by an operating system in use at the secondary host 125 may be used by backup manager 115, instead of or in addition to snapshot generator 353, in some embodiments.

Backup manager 115 may include a restoration engine 354 in some embodiments, which may be configured to implement restoration operations from secondary host 125 or from tertiary host 165. In such an embodiment, restoration engine 354 may provide a restoration selection interface 355, e.g., to allow a user and/or administrator to identify the primary and/or secondary data objects that are to be restored. In some implementations, the restoration selection interface may be a graphical user interface (GUI), while in other implementations, a command line or text-based interface may be used. In one implementation, restoration selection interface 355 may include a web page accessible via the Internet and/or an intranet. Restoration selection interface 355 may allow users to specify whether multi-stage restoration is to be used in some embodiments, and/or to specify restoration targets for single-stage restoration or multi-stage restoration. In some embodiments, a different restoration selection interface may be provided for administrative users than the interface provided to non-administrative users. End users may be allowed to request restoration of storage objects using "user-friendly" names for the objects, without, for example, specifying the exact logical paths or physical locations to the object to be restored.

Configuration information for backup operations, for example including locations of various versions of backed up objects, may be stored in backup configuration database 320 in one embodiment. In another embodiment, an administration server 357 may provide an interface such as an administrative console to configure and manage backup server 115 and its components, such as replicator 351 and snapshot generator 353. In one embodiment, in addition to backing up primary hosts 101, backup manager 115 may also be configured to back up data of one or more user workstations 302. In some implementations, any combination of replicator 351, snapshot generator 353 and restoration engine 354 may be implemented as independent modules or programs that may be invoked by backup manager 115 as needed. The processes of replication and snapshot generation may be performed independently of each other, or asynchronously with respect to each other, in some embodiments. Snapshots may be generated using any of a variety of specific techniques by snapshot generator 353, e.g., using operating system-provided snapshot functionality, volume mirroring, space efficient snapshot techniques, or custom hardware snapshot techniques.

Figure 4:
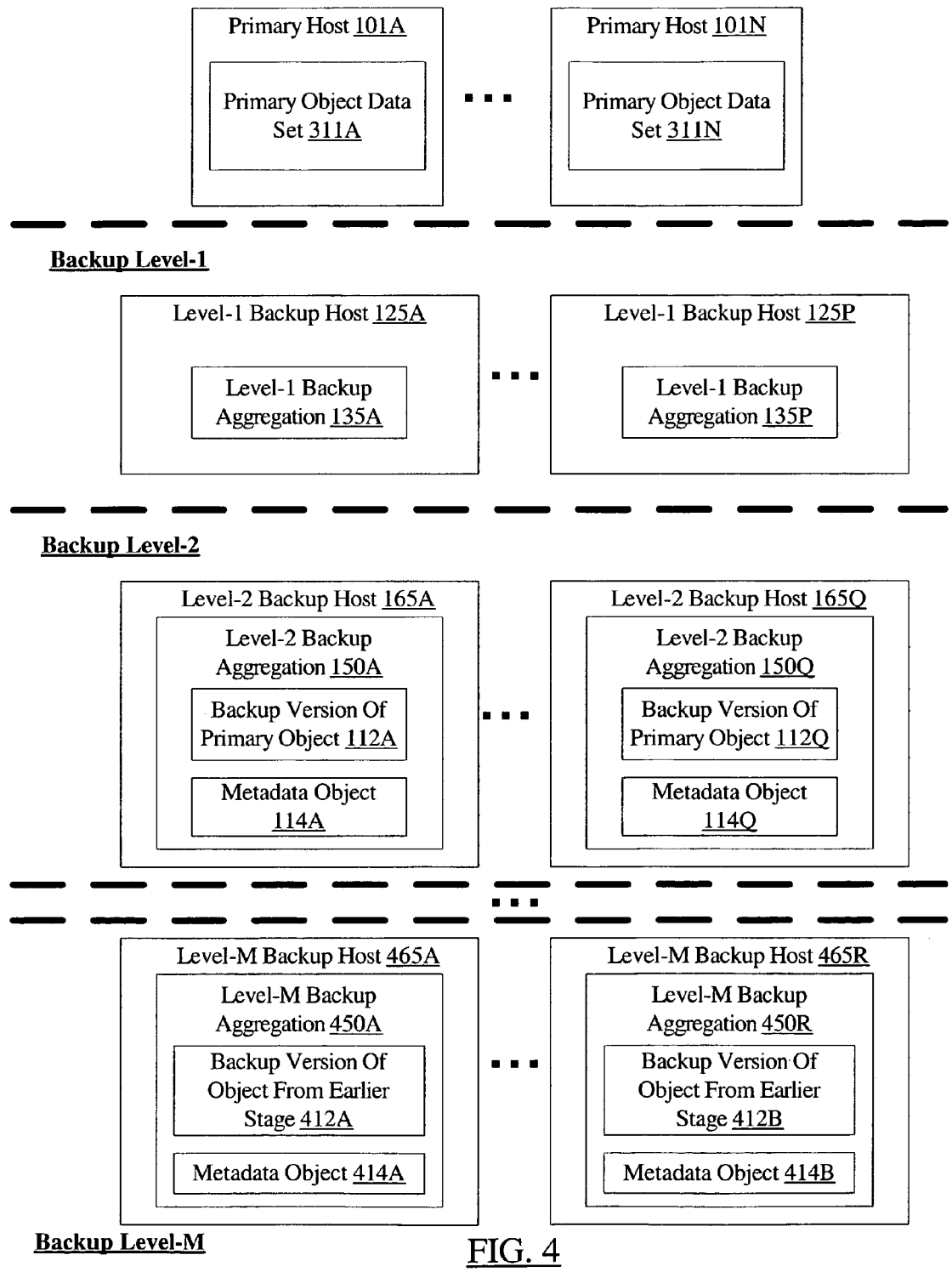
FIG. 4 is a block diagram illustrating an embodiment that includes more than two levels of backup storage.

FIG. 4 is a block diagram illustrating an embodiment that includes more than two levels of backup storage. As shown, in the first level of backup, primary data object sets 311 may be backed up (e.g., using replication as described above) within backup aggregations 135 at a plurality of level-1 backup hosts 125 (corresponding to the secondary hosts 125 illustrated in FIG. 1 and FIG. 3). Backup aggregations 150 at level-2 backup hosts may include backup versions 112 of primary data objects, as well as metadata objects 114 corresponding to level-1 data objects. Backup aggregations at additional backup levels, e.g., level-M backup aggregations 450, may include backup versions 412 of objects from any lower level, as well as metadata objects 414 for objects at any lower level.

For example, in one implementation, a level-M backup aggregation 450A may include images corresponding to data objects of primary hosts 101, level-1 backup hosts 125, etc., up to hosts from level (M-2), and may include a metadata object 414A for data objects of level (M-1). Such multiple levels of backup may be used, for example, in environments where historical versions of data objects have to be retained, but are rarely accessed—for example, versions less than a week old may be stored within levels 1 and 2, versions older than a week but less than a month old may be stored in level 3, versions older than a year at level 4, etc. In some embodiments where multiple hosts are employed within a backup level, the backup aggregations at each host within a given level may be identical—i.e., the same set of backup data may be replicated at multiple hosts within that given level. In other embodiments, a different subset of objects may be backed up at each host within a backup level: for example, files from a primary host file system F1 may be replicated at level-1 backup host 125A, files from a primary host file system F2 may be replicated at level-1 backup host 125B, etc. In some embodiments, the granularity of backup versions (e.g., whether backup versions of each user mailbox are stored as separate images, or whether the entire set of user mailboxes is stored within a single image) may differ from one host to another within a single backup layer.

In the embodiment shown in FIG. 4, data objects from any backup layer (except layer M, whose objects may not be backed up) or from primary hosts 101 may be restored to any other layer. Contents of the data object may be copied directly from any of the backup layers to the designated restoration target, or may be copied from one level to another in a multistage restoration process similar to the process described earlier and illustrated in FIG. 2b. Some backup levels may be skipped during multi-stage restoration in some embodiments, e.g., an image of a primary data object may be copied from level M to level 1 and from level 1 to the primary restoration target, thus skipping levels (M-1) through level 2. The architecture illustrated in FIG. 4 may provide extremely flexible backup and restore capabilities without duplicating data at any of the backup levels.

In some embodiments, backup versions of the contents of a primary data object 111 may be distributed among several backup aggregations 135 at one or more secondary (level-1) hosts 125, and portions of the backup versions from one or more backup aggregations 135 may then be combined to create images 112 at tertiary (level-2) hosts 165 (or at other levels in a multi-level backup architecture). The algorithms used to determine the specific subset of backed-up data that is combined or bundled into a particular image 112 may vary in different embodiments. For example, in an embodiment similar to that shown in FIG. 3, where replication is used to create the backup aggregations 135, replicator 351 may provide an interface to specify a replication source data set (such as a logical or physical volume, a directory, or a collection of files specified by name) and a replication destination at secondary host 125 (for example, a directory within a secondary host file system). Data for multiple replication sources may be replicated within a single replication destination. When backup manager 115 generates images 112 in such an embodiment (e.g., using snapshot generator 353), each image may correspond to a replication source data set. That is, in such an embodiment, each image 112 may include a point-in-time copy of the data for an entire replication source data set. In other embodiments, application-specific algorithms may be used to bundle the backed-up data from secondary host 125 into images 112. For example, if a particular replication source includes an electronic mail server's database, which may include the electronic mail mailboxes for all the users using that mail server, separate images 112 may be created for each user's mailbox. The use of such a technique of generating images 112 at an individual mailbox level may be based on an expectation that most restoration requests may be for a single user's mailbox, or for individual mail messages from a single user's mailbox (which may be easier to retrieve from a relatively small image corresponding to one mailbox than from a single large image that includes all users' mailboxes). In one embodiment, backup manager 115 may be configurable to allow administrators to specify backup bundling rules (e.g., the rules used to bundle backed up data into images 112 from which restoration is performed) for different primary data object sets or different primary applications. Bundling rules may also be specified for secondary data objects 140 in some embodiments (e.g., to indicate how secondary data objects 140 should be combined into backup objects 160 of FIG. 1). In embodiments where multiple layers of backup hosts are employed, bundling rules may be provided for more than one layer.

Figure 5:
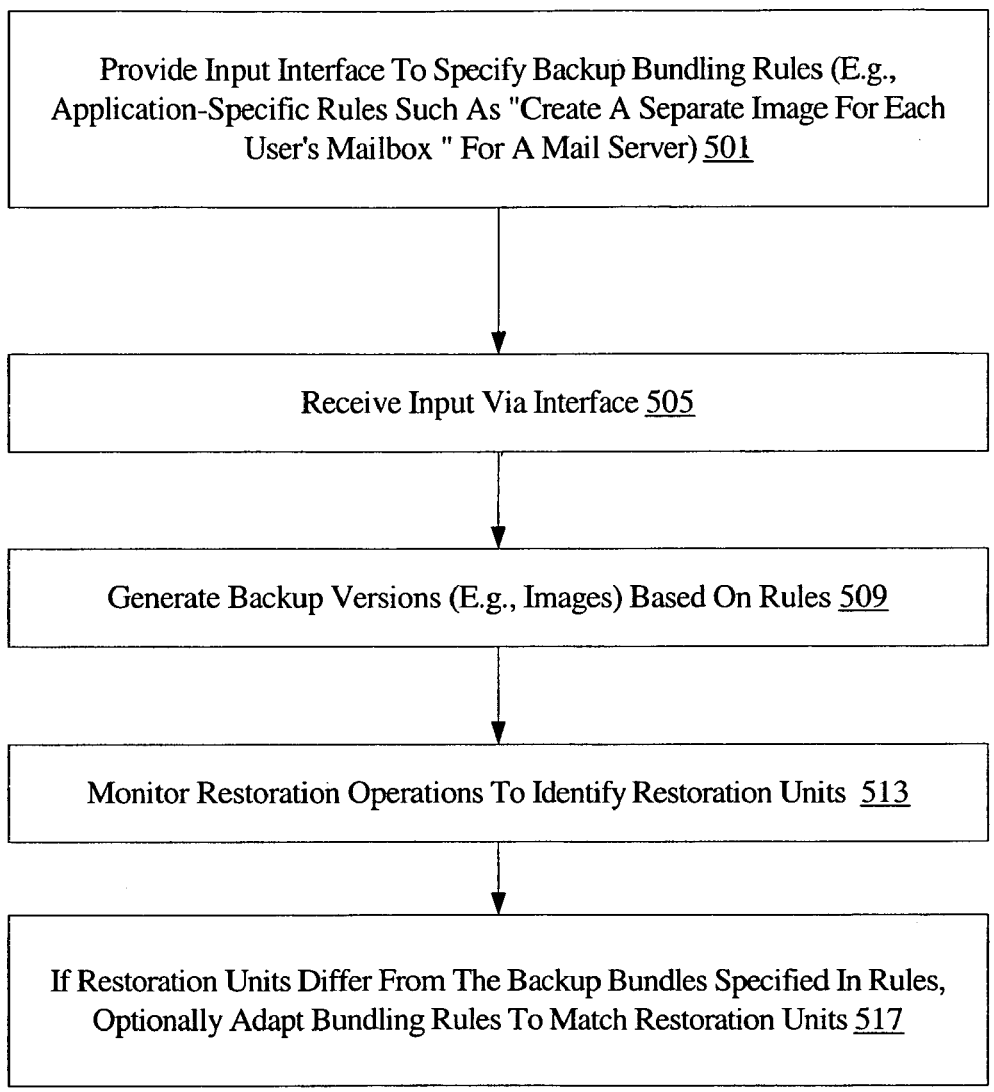
FIG. 5 is a flow diagram illustrating aspects of the operation of a backup manager in an embodiment where backup bundling rules may be specified.

FIG. 5 is a flow diagram illustrating aspects of the operation of backup manager 115 in an embodiment where backup bundling rules may be specified. As shown in block 501 of FIG. 5, backup manager 115 may be configured to provide an input interface to allow an administrator or other authorized user to specify backup bundling rules. Different rules may be specified for the backup data of different applications—e.g., for a mail server, the bundling rule may indicate that a separate image 112 should be created for each user's mailbox, while for a collection of home directories, the bundling rule may indicate that a separate image 112 should be created for each user's home directory. The interface may be implemented using a variety of techniques in different embodiments, such as a GUI, a command-line interface, or a parameter file. In response to input received via the interface (block 505), backup manager 115 may be configured to use the rules to generate the backup versions or images 112 (block 509). In some embodiments, backup manager 115 may be configured to monitor restore operations over time to identify the actual units in which restores are performed (block 513). For example, in the case of restorations of electronic mail, backup manager 115 may be configured to track how many restore operations were performed for individual e-mails, for individual user mailboxes, and for collections of mailboxes. In addition, in some embodiments, backup manager 115 may also be configured to gather performance statistics on restore operations, e.g., to track how long each restore operation took. In one implementation, based on the monitoring of restoration operations and/or on the performance statistics, backup manager 115 may optionally be configured to modify the bundling algorithm. For example, if in practice the manner in which backup data is bundled does not correspond to the units in which data is restored (e.g., if all restoration requests are for the entire set of mailboxes rather than for individual mailboxes), the bundling rules may be adapted to more closely match the observed restoration behavior (e.g., the entire set of mailboxes may be combined into a single image during future iterations of image generation) (block 517).

Figure 6:
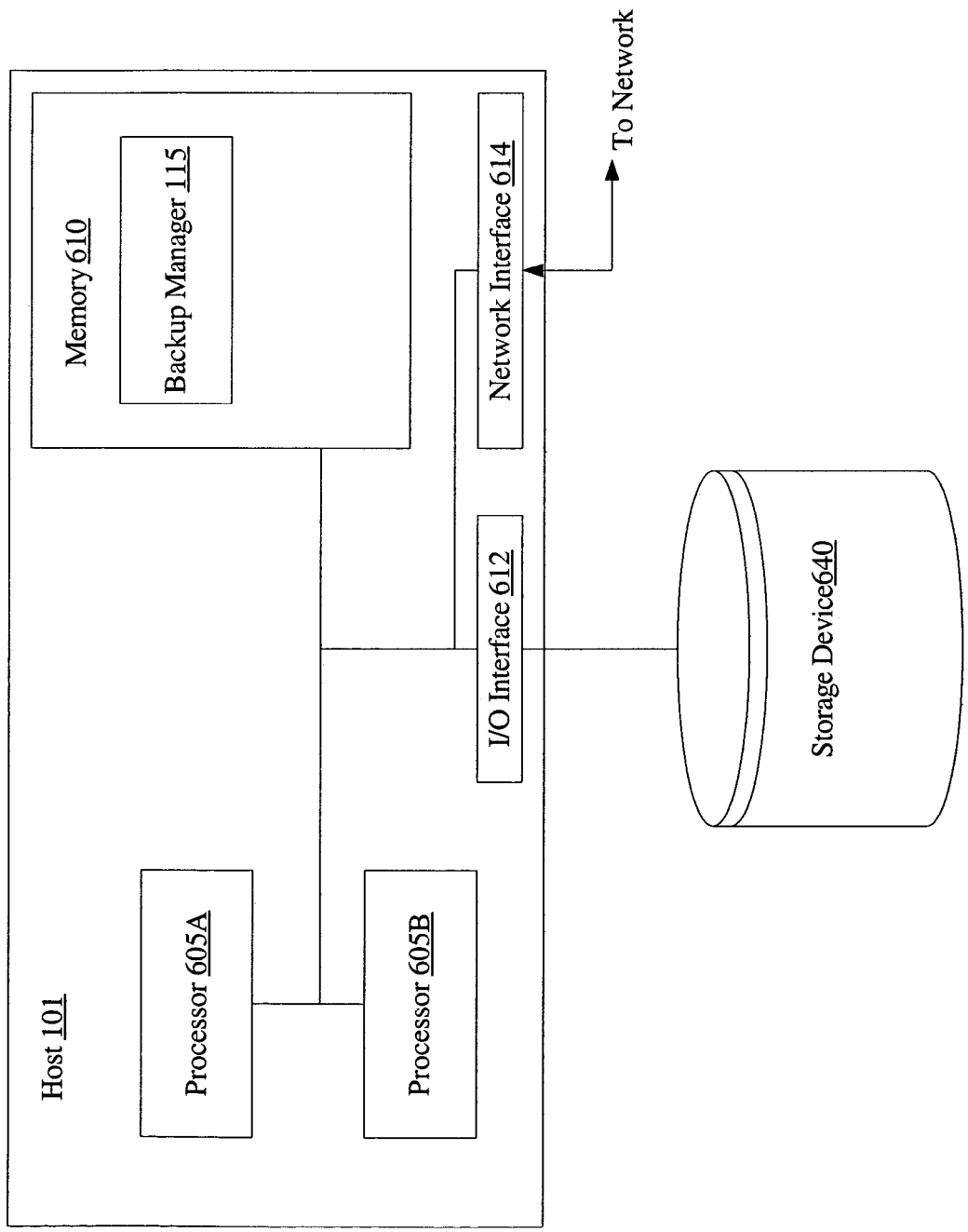
FIG. 6 is a block diagram illustrating constituent elements of a computer host, according to one embodiment.

In various embodiments, at least a portion of backup manager 115 may be executed at primary, secondary or tertiary hosts, or at each participating host in a multi-layer backup environment. FIG. 6 is a block diagram of a computer host 601 according to one embodiment. Computer host 601 may be a primary host 101, a secondary host 125, a tertiary host 165 or a host at any layer of a multi-layer backup architecture. As shown, host 601 may include one or more processors 605, such as processors 605A and 605B. In various embodiments, processors 605 may be implemented using any desired architecture or chip set, such as the SPARC™ architecture from Sun Microsystems or the x86-compatible architectures from Intel Corporation, Advanced Micro Devices, etc. Program instructions that may be executable to implement part or all of the functionality of backup manager 115 may be partly or fully resident within a memory 610 at a given point in time, and may also be stored on a storage device 640. Memory 610 may be implemented using any appropriate medium such as any of various types of RAM (e.g., DRAM, SDRAM, RDRAM, SRAM, etc.). In addition to processors 605 and memory 610, host 601 may also include one or more I/O interfaces 612 providing access to storage devices 640, one or more network interfaces 614 providing access to a network, interfaces to display devices (not shown), and the like. Any of a variety of storage devices 640 may be used to store the instructions as well as data for backup manager 115 and/or the contents of backup aggregations (e.g., aggregations 135 and 150) in different embodiments, include any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 640 may be directly coupled to host 601 in some embodiments (e.g., using the Small Computer Systems Interface (SCSI) protocol), or may be accessible over any desired storage interconnect such as a fiber channel fabric or storage area network (SAN) in other embodiments.

In addition to backup manager 115, memory 610 and/or storage devices 640 may also store operating systems software and/or software for various applications such as backup configuration database 320, administration server 357, etc. in various embodiments. In some embodiments, backup manager 115 may be included within an operating system, a storage management software product or another software package, while in other embodiments, backup manager 115 may be packaged as a standalone product. In one embodiment, restoration functions described above may be provided by a separate tool, e.g., a restoration manager, rather than by a backup manager 115. In some embodiments, part or all of the functionality of backup manager 115 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:

storing a first backup aggregation associated with a primary data object of a primary host within a secondary data object at a secondary host, wherein the first backup aggregation includes a first backup copy of the primary data object;

storing a second backup aggregation associated with the primary data object and the secondary data object, wherein the second backup aggregation includes:

a second backup copy of the primary data object; and a backup version of the secondary data object, wherein the primary data object is not duplicated in the backup version of the secondary data object, wherein the backup version of the secondary data object includes a metadata object which includes a pointer to the second backup copy of the primary data object; and
restoring the secondary data object using the backup version of the secondary data object, wherein said restoring the secondary data object includes using the pointer to access the second backup copy of the primary data object to restore contents of the primary data object to the secondary data object.

2. The method as recited in claim 1, further comprising:
restoring the primary data object using the second backup copy of the primary data object.

3. The method as recited in claim 1, further comprising:
restoring the primary data object to a primary restoration target, wherein said restoring the primary data object includes:
making a determination whether the primary data object is to be restored in a multi-stage restoration process;
if a result of the determination is positive, restoring the primary data object from the second backup copy to a secondary restoration target, and from the secondary restoration target to the primary restoration target; and
if a result of the determination is negative, restoring the primary data object directly from the second backup copy to the primary restoration target.

4. The method as recited in claim 3, further comprising:
if the result of the determination is negative, synchronizing the first backup aggregation with the primary restoration target after restoring the primary data object.

5. The method as recited in claim 3, wherein the determination is made based on a measurement of a specified workload metric.

6. The method as recited in claim 1, further comprising maintaining the first backup copy of the primary data object as a replica of the primary data object.

7. The method as recited in claim 6, wherein maintaining the first backup copy of the primary data object as a replica of the primary data object comprises updating the first backup copy of the primary data object in real time in response to write requests that modify the primary data object.

8. The method as recited in claim 1, wherein the primary data object includes a plurality of files of a file system.

9. The method as recited in claim 1, wherein the primary data object includes a plurality of electronic mail messages.

10. The method as recited in claim 1, wherein the secondary data object includes one or more directories of a file system.

11. The method as recited in claim 1, wherein the second backup aggregation is stored at a tertiary host.

12. A system, comprising:
one or more processors; and
memory coupled to the one or more processors and configured to store program instructions executable by the one or more processors to implement a backup manager configured to:
store a first backup aggregation associated with a primary data object of a primary host within a secondary data object at a secondary host, wherein the first backup aggregation includes a first backup copy of the primary data object;
store a second backup aggregation associated with the primary data object and the secondary data object, wherein the second backup aggregation includes:
a second backup copy of the primary data object; and
a backup version of the secondary data object, wherein the primary data object is not duplicated in the backup version of the secondary data object, wherein the backup version of the secondary data object includes a metadata object which includes a pointer to the second backup copy of the primary data object; and
restore the secondary data object using the backup version of the secondary data object, wherein said restoring the secondary data object includes using the pointer to access the second backup copy of the primary data object to restore contents of the primary data object to the secondary data object.

13. The method as recited in claim 1,
wherein the secondary data object includes additional data other than the first backup aggregation;
wherein the backup version of the secondary data object includes a duplicate copy of the additional data.

14. The system as recited in claim 12, wherein the backup manager is further configured to:
restore the primary data object to a primary restoration target, wherein said restoring the primary data object includes:
making a determination whether the primary data object is to be restored in a multi-stage restoration process;
if a result of the determination is positive, restoring the primary data object from the second backup copy to a secondary restoration target, and from the secondary restoration target to the primary restoration target; and
if a result of the determination is negative, restoring the primary data object directly from the second backup copy to the primary restoration target.

15. The system as recited in claim 14, wherein the backup manager is further configured to:
if the result of the determination is negative, synchronize the first backup aggregation with the primary restoration target after restoring the primary data object.

16. The system as recited in claim 14, wherein the backup manager is further configured to:
detect an occurrence of a failure; and
restore the primary data object to the primary restoration target in response to the detection of the failure.

17. The system as recited in claim 13, wherein the backup manager is further configured to maintain the first backup copy of the primary data object as a replica of the primary data object.

18. The system as recited in claim 12,
wherein the secondary data object includes additional data other than the first backup aggregation;
wherein the backup version of the secondary data object includes a duplicate copy of the additional data.

19. A computer readable medium storing program instructions, wherein the instructions are computer-executable to:
store a first backup aggregation associated with a primary data object of a primary host within a secondary data object at a secondary host, wherein the first backup aggregation includes a first backup copy of the primary data object;
store a second backup aggregation associated with the primary data object and the secondary data object, wherein the second backup aggregation includes:
a second backup copy of the primary data object; and
a backup version of the secondary data object, wherein the primary data object is not duplicated in the backup version of the secondary data object, wherein the backup version of the secondary data object includes a metadata object which includes a pointer to the second backup copy of the primary data object; and
restore the secondary data object using the backup version of the secondary data object, wherein said restoring the secondary data object includes using the pointer to access the second backup copy of the primary data object to restore contents of the primary data object to the secondary data object.

20. The computer readable medium as recited in claim 19, wherein the instructions are further computer-executable to:
   restore the primary data object to a primary restoration target, wherein said restoring the primary data object includes:
      making a determination whether the primary data object is to be restored in a multi-stage restoration process;
      if a result of the determination is positive, restoring the primary data object from the second backup copy to a secondary restoration target, and from the secondary restoration target to the primary restoration target; and
      if a result of the determination is negative, restoring the primary data object directly from the second backup copy to the primary restoration target.

21. The computer readable medium as recited in claim 20, wherein the instructions are further computer-executable to:
   if the result of the determination is negative, synchronize the first backup aggregation with the primary restoration target after restoring the primary data object.

22. The computer readable medium as recited in claim 19, wherein the instructions are further computer-executable to maintain the first backup maintain copy of the primary data object as a replica of the primary data object.

23. The computer readable medium as recited in claim 19,
   wherein the secondary data object includes additional data other than the first backup aggregation;
   wherein the backup version of the secondary data object includes a duplicate copy of the additional data.

24. A method, comprising:
   maintaining a first backup aggregation associated with a primary data object of a primary host at a secondary host, wherein the secondary host includes a secondary data object, wherein the first backup aggregation includes a first backup version of the primary data object stored at the secondary data object;
   generating a second backup aggregation associated with the primary data object and the secondary data object, wherein the second backup aggregation includes:
      a second backup version of the primary data object; and
      a backup metadata object corresponding to the secondary data object, wherein the backup metadata object includes a pointer to the second backup version;
   restoring the secondary data object, wherein said restoring the secondary data object includes using the pointer to access contents of the second backup version to restore at least a portion of the secondary data object; and
   restoring the primary data object to a primary restoration target, wherein said restoring the primary data object includes:
      making a determination whether the primary data object is to be restored in a multi-stage restoration process;
      if a result of the determination is positive, restoring the primary data object from the second backup version to a secondary restoration target, and from the secondary restoration target to the primary restoration target; and
      if a result of the determination is negative, restoring the primary data object directly from the second backup version to the primary restoration target.

25. The method as recited in claim 24, further comprising:
   if the result of the determination is negative, synchronizing the first backup aggregation with the primary restoration target after restoring the primary data object.

26. The method as recited in claim 24, wherein the determination is made based on a measurement of a specified workload metric.

27. A system, comprising:
   a processor; and
   a memory coupled to the processor and configured to store program instructions executable by the processor to implement a backup manager configured to:
      maintain a first backup aggregation associated with a primary data object of a primary host at a secondary host, wherein the secondary host includes a secondary data object, wherein the first backup aggregation includes a first backup version of the primary data object stored at the secondary data object;
      generate a second backup aggregation associated with the primary data object and the secondary data object, wherein the second backup aggregation includes:
         a second backup version of the primary data object; and
         a backup metadata object corresponding to the secondary data object, wherein the backup metadata object includes a pointer to the second backup version;
      restore the secondary data object, wherein said restoring the secondary data object includes using the pointer to access contents of the second backup version to restore at least a portion of the secondary data object; and
      restore the primary data object to a primary restoration target, wherein said restoring the primary data object includes:
         making a determination whether the primary data object is to be restored in a multi-stage restoration process;
         if a result of the determination is positive, restoring the primary data object from the second backup version to a secondary restoration target, and from the secondary restoration target to the primary restoration target; and
         if a result of the determination is negative, restoring the primary data object directly from the second backup version to the primary restoration target.

28. The system as recited in claim 27, wherein the backup manager is further configured to:
   if the result of the determination is negative, synchronize the first backup aggregation with the primary restoration target after restoring the primary data object.

29. The system as recited in claim 27, wherein the backup manager is further configured to:
   detect an occurrence of a failure; and
   restore the primary data object to the primary restoration target in response to the detection of the failure.

30. A computer readable medium comprising program instructions, wherein the instructions are computer-executable to:
   maintain a first backup aggregation associated with a primary data object of a primary host at a secondary host, wherein the secondary host includes a secondary data object, wherein the first backup aggregation includes a first backup version of the primary data object stored at the secondary data object;
   generate a second backup aggregation associated with the primary data object and the secondary data object, wherein the second backup aggregation includes:

a second backup version of the primary data object; and a backup metadata object corresponding to the secondary data object, wherein the backup metadata object includes a pointer to the second backup version;

restore the secondary data object, wherein said restoring the secondary data object includes using the pointer to access contents of the second backup version to restore at least a portion of the secondary data object; and restore the primary data object to a primary restoration target, wherein said restoring the primary data object includes:

making a determination whether the primary data object is to be restored in a multi-stage restoration process;

if a result of the determination is positive, restoring the primary data object from the second backup version to a secondary restoration target, and from the secondary restoration target to the primary restoration target; and if a result of the determination is negative, restoring the primary data object directly from the second backup version to the primary restoration target.

31. The computer readable medium as recited in claim 30, wherein the instructions are further computer-executable to:

if the result of the determination is negative, synchronize the first backup aggregation with the primary restoration target after restoring the primary data object.

* * * * *